(12) United States Patent
Discenzo (10) Patent No.: US 6,304,176 B1
(45) Date of Patent: Oct. 16, 2001

(54) PARASITICALLY POWERED SENSING DEVICE

(75) Inventor: Frederick M. Discenzo, Brecksville, OH (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/164,452

(22) Filed: Sep. 30, 1998

(51) Int. Cl.[7] ....................................... G08B 1/08
(52) U.S. Cl. ...................... 340/539; 340/506; 340/540
(58) Field of Search ................................ 340/506, 539, 340/540, 679, 680

(56) References Cited

U.S. PATENT DOCUMENTS 5,390,206 * 2/1995 Rein et al. ............................. 375/1

* cited by examiner

Primary Examiner—Daryl Pope
(74) Attorney, Agent, or Firm—John M. Miller (57) ABSTRACT

A parasitically powered remote sensing device for monitoring an industrial system. The device comprising a tuned transducer which converts stray energy emitted by the system into an electric potential for consumption by a remote sensing device and/or a wireless communications link. In an alternate embodiment the remote sensing device further comprises an energy storage element connected to the transducer to provide the sensing element and wireless communications link with the electric potential when the stray energy is insufficient to power the remote sensing device.

25 Claims, 7 Drawing Sheets

PARASITICALLY POWERED SENSING DEVICE

FIELD OF INVENTION

This invention relates generally to a parasitically powered sensing device and, more particularly, it relates to a family of apparatuses that parasitically transforms stray mechanical and/or electrical energy associated with a system into electric power which may be used to power at least one of a sensing element, an actuator, an enunciator, an energy storage element, a processor and/or a wireless communications link.

BACKGROUND OF THE INVENTION

In a factory setting there are a multitude of mechanical and electrical components, each performing a particular function or functions as part of a system which may, for example, be an automated assembly line. While many of the systems components may be highly efficient, each will produce stray energy losses during its normal operation. For example, it is common for electromagnetic energy as well as mechanical/vibrational, thermal and acoustic energy to stray outside a motor stator into the surrounding environment. Similarly, fluid or air handling conduits and mechanical bearings produce stray mechanical energy typically in the form of mechanical oscillation.

Remote sensors located proximal to mechanical and electrical components may be used to determine the condition of those components or the surrounding system. In general, each of the remote sensors requires wiring for power and communication with a remote processor. However, such wiring dramatically increases the cost of each sensing device often making extensive remote sensing impractical. For example, it is not uncommon for the cost of such wiring to exceed the cost of the sensing device itself. Alternately, the remote sensing devices may be battery powered and provide information via an RF communications link. However, the batteries required to power each sensor add significant cost and maintenance problems, especially when the sensors are located in difficult to reach areas. Furthermore, batteries have an uncertain life and are therefore unreliable. They also suffer from low power density and rapid deterioration and aging especially in hostile environments. Also the load versus time curve for batteries typically show a very rapid decline in power output at the end of battery life following a relatively long period of fairly steady output. This makes it difficult to predict when batteries need to be changed.

Accordingly, there is a present need for an alternate method and apparatus for powering remote sensors which takes advantage of the stray energy radiated by the electrical and mechanical components of a system.

SUMMARY OF THE INVENTION

In accordance with the present invention there is provided a parasitic energy transducer which transforms stray energy into an electrical voltage to power the remote sensing devices. The remote sensing devices are generally comprised of three elements. The first element is a sensing element which may be any of the presently known devices for sensing a condition in a particular environment. The second element is a wireless communications link which provides a means for networking the remote sensing device into a remote processor which may be an automated control system, for example. The third element is a parasitic energy transducer capable of transforming stray energy into an electric potential for powering at least the wireless communications link. A plurality of transducers may be implemented within one sensing device to produce greater power to enable constant operability of the sensing element and wireless communications link or where more power is desirable. Each transducer may be tuned to the frequency of the stray energy losses of the system to provide a higher yielding and more efficient power source.

In accordance with an alternate embodiment, the apparatus further comprises an energy storage element which provides power to the wireless communications link and sensing element when the transducer is unable to do so.

In accordance with another embodiment of the invention there is provided a parasitically powered sensing device for monitoring the condition of a system in an industrial environment which produces stray energy. The device comprises a processor having a memory for storing a diagnostic algorithm; a wireless communications link coupled to the processor; and a tunable transducer coupled to the processor and the wireless communications link, the transducer converting the stray energy into a voltage. The processor and wireless communications link are powered by the transducer and the processor produces a diagnostic condition signal based on the voltage and the diagnostic algorithm which is transmitted by the wireless communications link.

In accordance with still another aspect of the invention there is provided a method for sensing a condition of a system producing stray energy. The method comprises the steps of coupling a sensor to said system for detecting the condition and generating a condition signal; coupling a tunable transducer to the sensor to provide a voltage to said sensor, the transducer being tunable to the stray energy of the system; and coupling a wireless communications link to the sensor for transmission of said condition signal.

It is therefore an object of the present invention to provide a remote sensing device which is primarily powered by a parasitic energy transducer.

It is a further object of the present invention to provide a power supply for a sensing element and wireless communications link in a remote sensing device; the power supply comprising at least one parasitic energy transducer which transduces stray energy radiated from a system into electric power for consumption by at least the wireless communications link.

It is yet another object of the present invention to provide an inexpensive remote sensing device which can detect and report an incipient fault condition of a system or component it is monitoring.

It is still another object of the present invention to provide a parasitically powered remote sensing device with an on-board processor and wireless communications link wherein the processor is capable of executing diagnostic and/or prognostic algorithms.

DETAILED DESCRIPTION OF THE PREFERRED EMBODIMENT

Figure 1:
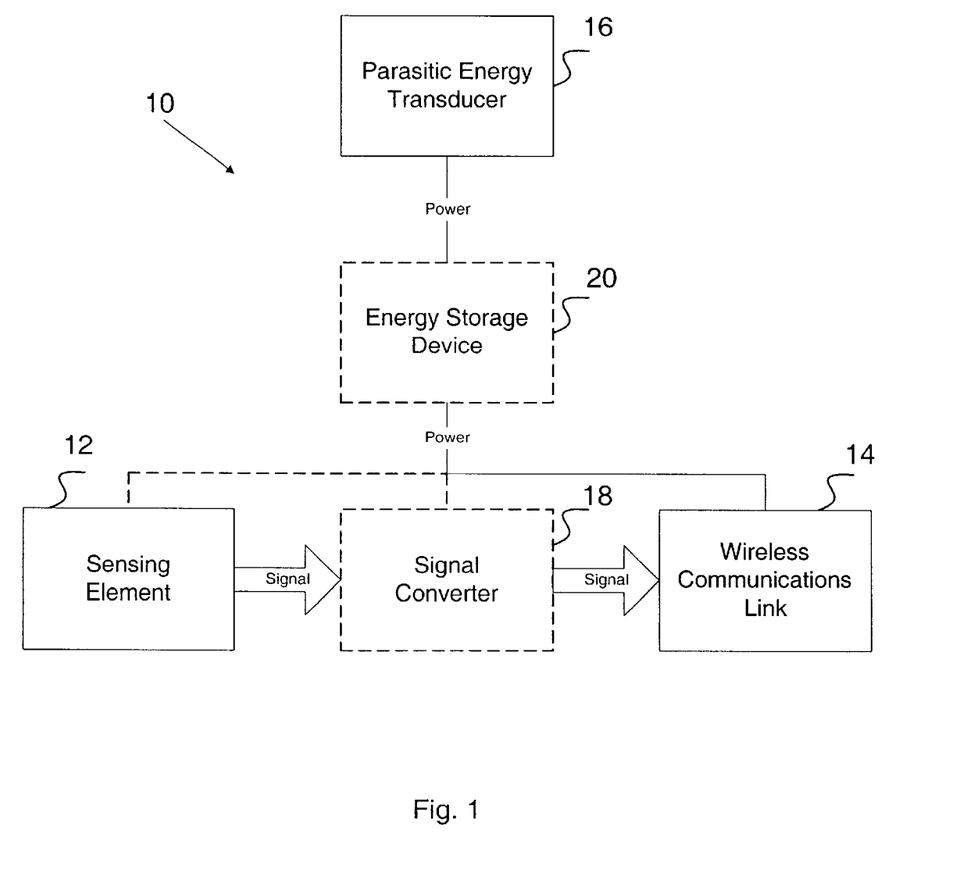
FIG. 1 is a block diagram of a remote sensing device in accordance with the preferred embodiment of the present invention.

With reference to FIG. 1 there is shown a block diagram of a remote sensing device 10 comprising a sensing element 12, a wireless communications link 14 and a tunable parasitic transducer 16. The sensing element 12 may be any conventional element for sensing a condition such as temperature vibration, pressure, acceleration, electrical quantities, or illumination, for example. Preferably the sensing element 12 requires minimal or no separate power to perform its sensing operation. In particular, there presently exists micro-electromechanical systems (MEMS) which can sense all of the above-mentioned quantities which require little or no external power. FIG. 1 also shows a signal converter 18 and energy storage device 20 which are discussed below but which are not required and therefore shown in dotted lines.

Preferably the parasitic energy transducer 16 is tunable. Tuning may be performed in a static manner prior to sensor deployment based on anticipated field strength, vibrational frequencies, and or displacement. For example, in electromagnetic transducers tuning may be effected by varying certain capacitance and/or inductance values in the transducer circuit. Likewise, in electromechanical transducers parameters such as effective spring constant, fulcrum points and mass may be varied during the tuning process. Alternately, an on-board logic element (e.g. processor 22) may adaptively tune the transducer to the frequency of the highest recoverable energy. In this manner the transducer will operate with greater efficiency when the frequency of the recoverable energy varies over time.

The remote sensing device 10 may further include a signal converter 18 and/or filter between the sensing element 12 and the wireless communications link 14. Signal converter 18 conditions the raw signal output from the sensing element 12 for usage by the communications link 14. In its simplest form, the signal converter 18 may a tuned filter which removes unwanted noise received by the sensing element 12. However, with reference to FIGS. 2 and 5, a processor 22 may be substituted for the signal converter 18. In addition to signal conditioning, processor 22 may perform prognostic and/or diagnostic routines using as input the output of sensing element 12. For example, the processor may compare signals from the sensing element with known fault conditions which are stored in its memory. Based on the comparison the processor 22 can output a diagnostic condition of the device being monitored. In particular, known stored vibrational characteristics of a bearing may be stored in the processor which are compared with the measured vibration signals produced by the sensing element 12. Similarly, known electrical field strength or frequency values may be stored in the processor and compared with corresponding measured values produced by the sensing element 12. When a the data indicates a failure or an incipient failure the processor will communicate the particular fault condition. Alternately, the processor 22 is capable of more complex mathematical calculations such as FFT's or other algorithms which may be required for more complex diagnostic or prognostic capabilities. In these embodiments wireless communications link 14 may only require power at predetermined intervals or when a predetermined diagnostic/prognostic condition occurs. Processor 22 may also serve as an A/D converter or filter for the signals output from the sensing element 12.

Figure 2:
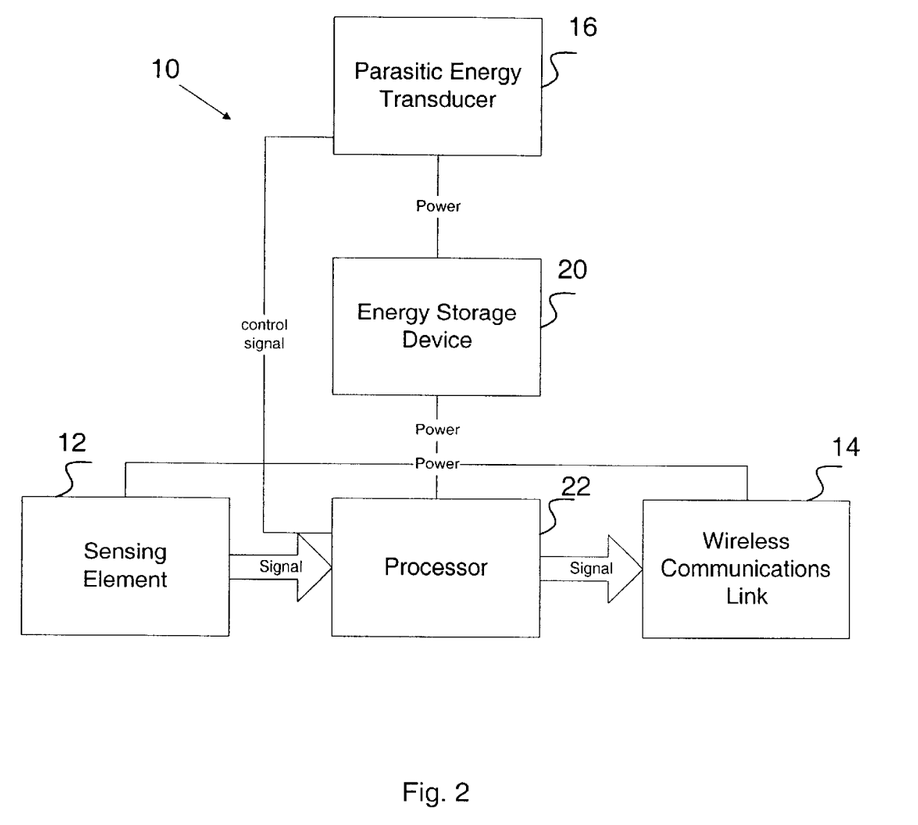
FIG. 2 is a block diagram of a remote sensing device in accordance with an alternate preferred embodiment of the present invention.
Figure 5:
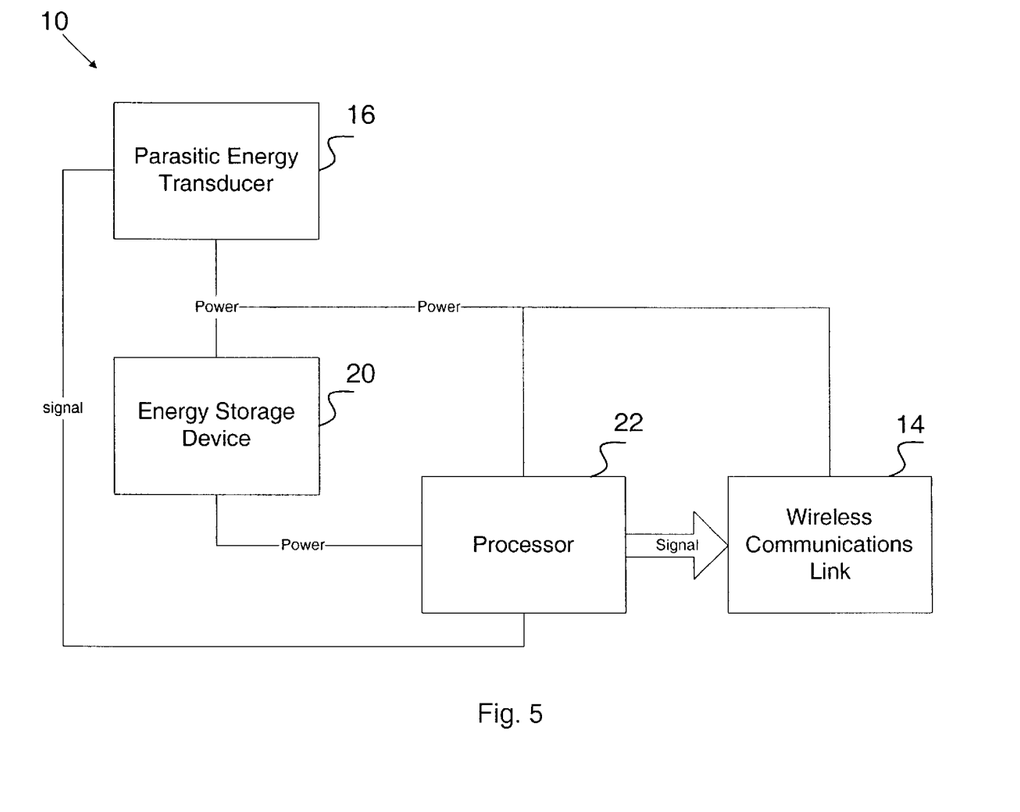
FIG. 5 is a block diagram of a remote sensing device in accordance with yet another preferred embodiment of the present invention.

Processor 22 may also serve to adaptively tune the transducer 16 such that the optimal or maximum power is transferred to the processor 22 and wireless communications link 14 or other portion of the device 10 which requires power. For example, the processor may determine the stray energy frequency band that contains the optimal or maximum power and subsequently tune the electrical or mechanical parameters of the transducer 16 so that the transducer produces optimal or maximum power.

The wireless communications link 14 is preferably a wireless radio frequency (RF) transmitter. In the present state of the art there exists high quality 900 Mhz and 2.2 Ghz RF transmitters capable of accurately transmitting data without high power. Alternately, when the sensors are within a line of sight of their receiving target, the wireless communications link 14 may be an infrared transmitter. Preferably, the link 14 periodically transmits the condition signal generated by the sensing element 12 or transmits the condition signal only when a predetermined condition has occurred. In this manner, the link 14 will consume a lower amount of power.

In alternate embodiments of the present invention, an energy storage device 20 (shown in FIGS. 1–5) is connected to the parasitic energy transducer 16 for storing energy when either the sensing element 12, the wireless communications link 14, processor 22 or actuator/enunciator/display 24 are using power supplied by the parasitic energy transducer 16. In this case, when the device being monitored (e.g. bearing) is operating normally and the link is not communicating the condition signal, the transducer 16 will charge the storage element 20. In this manner, the device 10 may operate when there is insufficient power to drive the transducer 16 but an abnormal or other predetermined diagnostic or prognostic condition is present.

In its preferred embodiment, the energy storage element 20 consists of a capacitor, for example, for storing power from the parasitic energy transducer 16. As shown in FIGS. 1–5, the energy storage element 20 is connected to the sensing element 12 and the wireless communications link 14 for supplying power when more power is needed than the parasitic energy transducers may supply. The energy storage element 20 may also be coupled to the signal converter 14, processor 22 and/or actuator/enunciator/display 24 or any other device in the remote sensing device 10.

In another embodiment of the present invention the remote sensing device may also include an energy storage device 20 which may be, for example, a battery. It is recognized that in some cases, the stray energy radiated from the system may be intermittent or otherwise insufficient to provide the power required by wireless communications link 14 or the sensing element 12. Accordingly, the energy storage element 20 is coupled to the sensing element 12 and/or link 15 or other component in the remote sensing device 10 to provide power when the transducer 16 is unable to do so. Additionally, the transducer 16 is further coupled to the energy storage element 20 so that when the transducer is fully operational and the link 16 is not consuming power, the transducer may charge up the battery.

Figure 3:
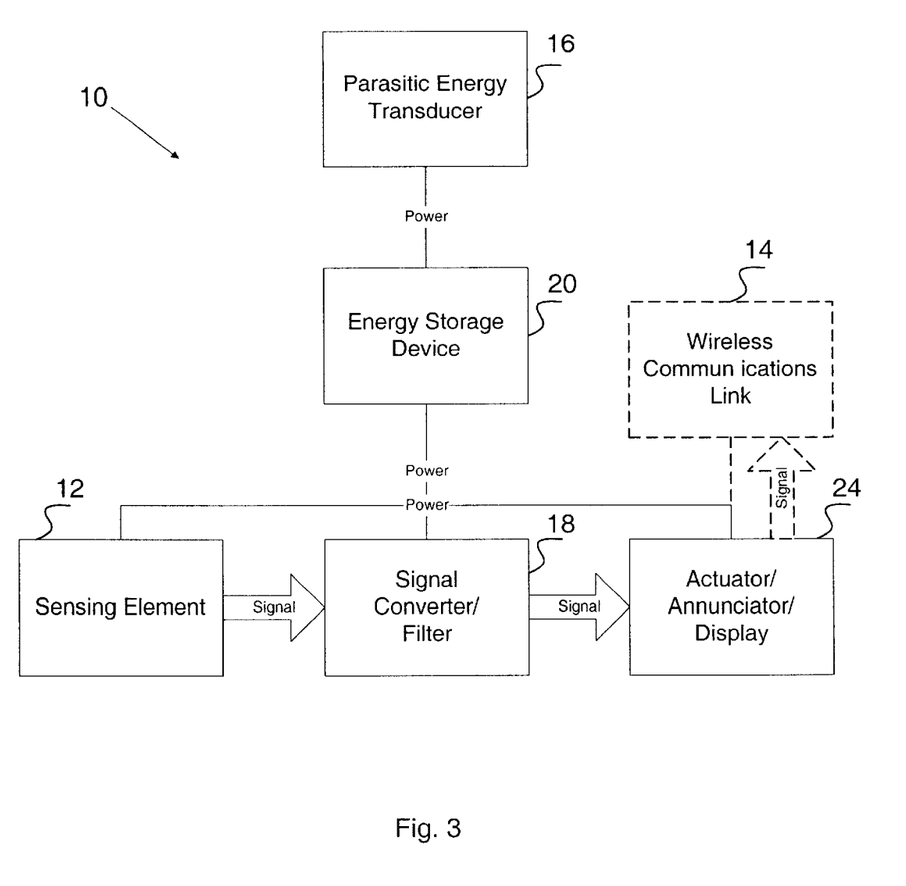
FIG. 3 is a block diagram of a remote sensing device in accordance with a another alternate preferred embodiment of the present invention.

With reference to FIG. 3, the remote sensing device 10 may control an actuator 24. In this embodiment, when the sensing element 12 receives a predetermined input, the actuator 12 is actuated. Alternately, an enunciator or led display (also labeled 24) may provide local diagnostic/ prognostic information about the device or system being monitored.

Figure 4:
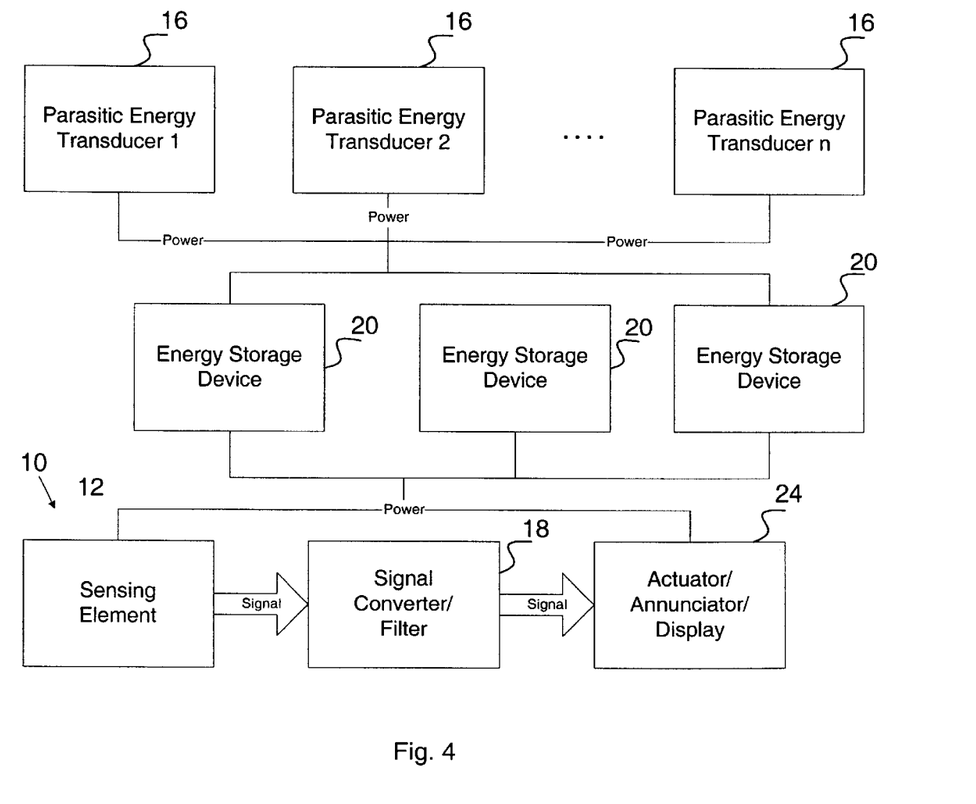
FIG. 4 is a block diagram of a remote sensing device in accordance with a third alternate preferred embodiment of the present invention.

With reference to FIG. 4, a plurality of parasitic energy transducers 16 may be implemented independently or in conjunction with the plurality of energy storage elements 20. This embodiment will provide a higher rate of energy transfer to the sensing element 12, wireless communications link 14 and/or the energy storage element(s). This embodiment may be necessary when the sensing device 10 is used in a system having low or intermittent stray losses, or when power would otherwise be insufficient to operate the sensing device or wireless communications link. For example, when the stray losses occur periodically, a plurality of transducers 16 would charge the energy storage elements more rapidly. Power would then be readily available to the sensing element 12, if required, or wireless communications link 14.

With continued reference to FIG. 4, a plurality of energy storage elements may be implemented for storing increased amounts of power when it is anticipated that insufficient power may exist for the successful operation of the sensing element 12. For instance, it may be necessary to ensure a constant power supply to the sensing element 12 and/or the wireless communications link –when used in conjunction with an electrical component that requires constant monitoring.

With reference to FIG. 5, there is another embodiment of the remote sensing device 10. In this embodiment, the parasitic energy transducer 16 serves two roles. First, the transducer 16 provides energy to the device 10. Second, the transducer 16 serves as a sensor. For example, the processor 22 can make diagnostic or prognostic determinations based on the voltage or energy/power produced by the transducer. In addition, the processor 22 may serve to adaptively tune the transducer 16 such that the maximum power is transferred to the processor 22 and wireless communications link 14. In this case the processor 22 may determine the stray energy frequency band that contains optimal power and subsequently tune the electrical or mechanical parameters of the transducer 16 via a control signal so that the transducer produces optimal or maximum power.

Figure 6:
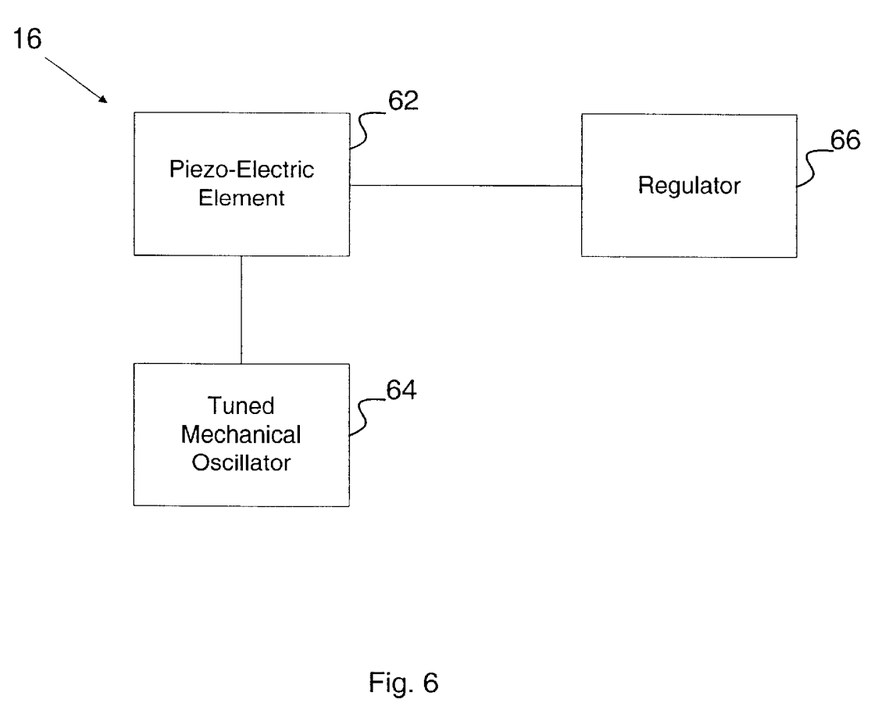
FIG. 6 is a block diagram of a first transducer in accordance with the preferred embodiment of the present invention.

With reference to FIG. 6, there is shown one possible arrangement for the parasitic energy transducer 16. As shown, the transducer 16 is a piezo-electric crystal element 62 coupled to a tuned mechanical oscillator 64. Element 62 generally represents a piezo-electric substance which produces an electric potential when its surface is deflected. For example, it is well known that zinc oxide and ferroelectrics of the lead zirconate titanate family are candidates for piezoelectric actuation as well as sensing elements in micro-electromechanical systems (MEMS). Similarly, quartz crystal possess piezoelectric characteristics to a lesser degree. Alternately and preferably, the sensing element 12 and transducer 16 may be in the form of a micro-electromechanical system. Specifically, in the present state of the art there exists micro piezo-electric and pyro-electric elements incorporated into a single package.

The oscillator 64 is a spring and mass or a simple mechanical tuning fork. When a spring and mass is employed, the stray mechanical energy losses of a component or system cause the spring and mass to oscillate and deflect a portion of the element 62 thereby generating an electric potential. Preferably the oscillator 64 is tunable to a vibrational frequency band possessing the highest amount of energy. Tuning may be performed in a static manner based on the anticipated frequency and/or displacement. Alternatively, an on-board logic such as processor 22 (FIG. 2) may adaptively tune the oscillator to the frequency of highest recoverable energy. Tuning the oscillator allows the transducer 62 to generate a larger electric potential. Also shown in FIG. 6 is a regulator 66 which rectifies and controls the electric potential generated by element 62 to produce an output potential which is consumed by the wireless communications link 14 and the sensing element 12. The regulator 66 comprises a diode bridge and capacitor which rectifies the AC output from the element 22 into a smooth DC voltage, for example.

In other embodiments, transducer 16 is a photo-electric cell which converts light into an electric potential. In this case the stray energy is obtained from a light source which may or may not be part of the system the sensor is monitoring. In yet another embodiment, the transducer may be a pyroelectric or thermoelectric element which produces an electric charge in response to a thermal gradients. Additionally, in many cases the transducer 16 may be a MEMS device. As discussed above, in the present state of the art there exists micro-electromechanical systems which employ thin film piezo-electric and pyroelectric elements and mechanical fulcrum and lever combinations or springs which may be designed or tuned to oscillate at set frequencies.

Figure 7:
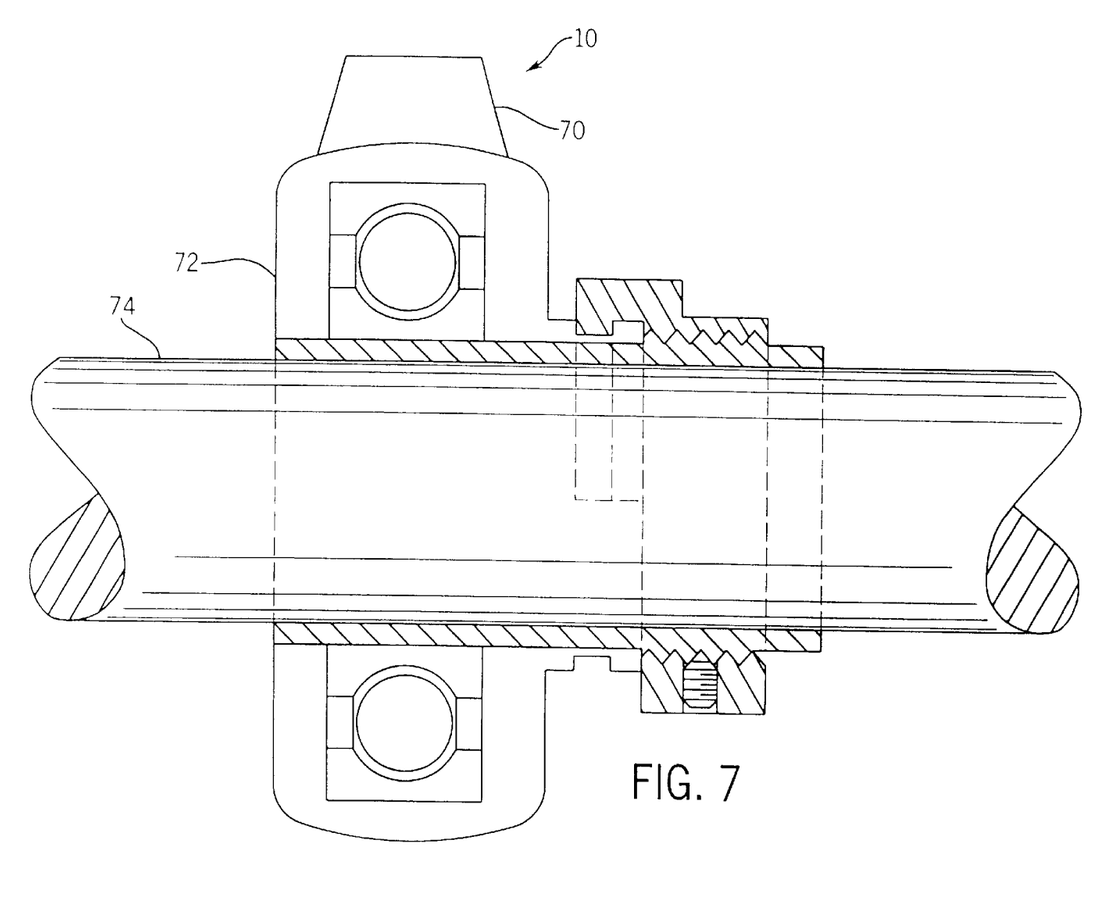
FIG. 7 is a side view of a remote sensing device coupled to a bearing in accordance with the preferred embodiment of the present invention.

With reference to FIG. 7 there is shown a remote sensing device 10 in accordance with the present invention coupled to a bearing 72 and shaft 74 which is part of an electromechanical system monitored by the sensing device. As shown, the remote sensing device is deployed within a housing 70. During operation of the system, the shaft is coupled to either a motor or generator. When coupled to a motor, the shaft is further coupled to devices such as a conveyor, pump, fan, or any other conventional device used in a factory environment, for example. Over time, the bearing will wear due to heating, loading, or fatigue which subsequently cause detectable oscillations that are monitored by the device 10. Importantly, predetermined conditions such as incipient failure modes or other abnormal conditions may be detected through monitoring the mechanical oscillations generated in the bearing. For example, an increase in the oscillations generally indicates an imbalance or asymmetry within the bearing which may be caused by non-linear wear or an unbalanced load attached to the shaft. In either case if the problem persists there is an increased probability of a failure occurring which will cause an unscheduled stoppage of the system. Alternatively, the sensing device could sense an atypical increase in temperature, which could indicate a greatly accelerated loss of lubrication and increased bearing wear.

The remote sensing device 10 permits a low cost means for monitoring a bearing to detect incipient failure modes of the bearing or system. The device shown in FIG. 7 may be constructed in accordance with any of the embodiments shown in FIGS. 1–6. For example, the sensing element 12 may be a piezoelectric element and the parasitic energy transducer 16 may be another piezoelectric element coupled to a tuned mechanical oscillator. Preferably the sensing element is tuned to one or more frequency bands which are known to occur prior to a failure. Alternately, the sensing element may be connected to a filter which removes any condition signal generated during normal operation thereby outputting a condition signal only when an abnormal condition occurs.

The parasitic energy transducer 16 may be tuned to a frequency band different from that of the sensing element 12. In the preferred embodiment, the transducer 16 is tuned to a frequency band which has the highest amount of power when the system is in normal operation. In this manner, the transducer 16 can maximize its ability to generate power from the surrounding environment.

In operation, the sensing element 12 detects an abnormal operating condition within the system and produces a condition signal indicating the abnormal operating condition. The condition signal is then coupled to the wireless communications link 14 for transmission thereof. Alternately, the condition signal may be coupled to an actuator, enunciator or display element. As discussed above, the condition signal may indicate an incipient failure mode or any abnormal condition of the system or apparatus which the device 10 is monitoring. The parasitic energy transducer 16, which generates electric power by transducing the stray energy into an electric potential, is also coupled to the wireless communications link 14. Accordingly, when an incipient failure mode or other abnormal condition occurs a condition signal is generated by the sensing element which is transmitted by the link 14 to a remote processor.

The description given here of the preferred embodiment of the invention is intended to illustrate the invention. This description is not intended to limit the scope of the invention, which should be interpreted in accordance with the appended claims. For example, the actuator, enunciator or display shown in FIG. 3, may be incorporated into any of the embodiments. Similarly, the processor 22 or signal converter 22 may be incorporated into any of the embodiments and as such these variations of the remote sensing device are intended to be within the scope of the invention.

I claim:

1. A parasitically powered sensing device for monitoring a condition of a system in industrial environment which produces stray energy, the device comprising:
    a sensing element for sensing the condition and producing a condition signal representative of the condition;
    a wireless communications link coupled to the sensing element and transmitting the condition signal; and
    a tunable transducer electrically coupled to the wireless communications link, the transducer converting the stray energy from the system into a voltage which powers the wireless communications link.

2. The sensing device as set forth in claim 1 wherein the tunable transducer is electrically coupled to the sensing element and the voltage powers the sensing element.

3. The sensing device as set forth in claim 1 further comprising:
    a processor coupled to the transducer, the sensing element and the wireless communications link.

4. The sensing device as set forth in claim 3 wherein the processor includes a memory for storing a diagnostic algorithm wherein the processor receives the condition signal and produces a diagnostic condition signal based upon the condition signal and the diagnostic algorithm.

5. The sensing device as set forth in claim 3 wherein the processor adaptively tunes the transducer to produce a maximum output voltage.

6. The sensing device as set forth in claim 3 wherein the sensing element produces an analog condition signal and the processor converts the analog condition signal into a digital condition signal.

7. The sensing device as set forth in claim 1 further comprising:
    a signal converter coupled to the sensing element, the wireless communications link and the transducer wherein the signal converter filters out unwanted condition signals to produce a filtered signal.

8. The sensing device as set forth in claim 7 further comprising:
    an actuator coupled to the signal converter, the actuator receiving the filtered signal.

9. The sensing device as set forth in claim 7 further comprising:
    an LED coupled to the signal converter.

10. The sensing device as set forth in claim 1 wherein the transducer comprises a plurality of individual transducer elements.

11. The sensing device as set forth in claim 1 further comprising:
    an energy storage device coupled to at least the transducer and the wireless communications link, the energy storage device storing electric power when the transducer produces more power than is required by the wireless communications link.

12. The sensing device as set forth in claim 11 wherein the energy storage device is a capacitor.

13. The sensing device as set forth in claim 11 wherein the energy storage device is a battery.

14. The sensing device as set forth in claim 11 wherein the energy storage device comprises a plurality of energy storage elements coupled together in parallel.

15. The sensing device as set forth in claim 1 wherein the transducer comprises:
    a piezoelectric element; and
    a spring coupled to a mass;
    the piezoelectric element coupled to the spring;
    wherein the stray energy moves the mass which deforms the piezoelectric element to produce the voltage.

16. The sensing device as set forth in claim 1 wherein the transducer comprises:
    a piezoelectric element; and
    a tuned fork;
    the piezoelectric crystal coupled to the tuned fork;
    wherein when the tuned fork moves in response to the stray energy and deforms the piezoelectric crystal to produce the voltage.

17. The sensing device apparatus as set forth in claim 1 wherein the transducer comprises:
    a pyroelectric element which transforms the stray energy into the voltage.

18. The sensing device as set forth in claim 1 wherein the transducer comprises:
    a micro electro-mechanical system which transforms the stray energy into the voltage.

19. The sensing device as set forth in claim 1 further comprising:
    a regulator coupled to the transducer, the regulator rectifying and controlling a magnitude of the voltage produced by the transducer.

20. A parasitically powered sensing device for monitoring the condition of a system in an industrial environment which produces stray energy, the device comprising:
    a processor having a memory for storing a diagnostic algorithm;
    a wireless communications link coupled to the processor; and
    a tunable transducer coupled to the processor and the wireless communications link, the transducer converting the stray energy into a voltage;

wherein the processor and wireless communications link are powered by the transducer and the processor produces a diagnostic condition signal based on the voltage and the diagnostic algorithm which is transmitted by the wireless communications link.

21. The sensing device as set forth in claim 20 wherein the processor adaptively tunes the transducer to transfer a maximum power to the processor and the communications link.

22. In an automated system comprising a controller and a plurality of controlled devices and a sensor for sensing a condition of at least one of said devices and producing a condition signal, said sensor including:

a parasitic energy transducer, said transducer coupled to said sensor, said transducer converting stray energy radiated from said at least one of said devices into an electric potential; and a wireless communications link coupled to said sensor and said parasitic energy transducer, said wireless communications link receiving said condition signal;

wherein said electric potential powers said wireless communications link.

23. The sensor as set forth in claim 22, further comprising an energy storage element, said energy storage element coupled to said parasitic energy transducer.

24. A method for sensing a condition of a system producing stray energy, the method comprising the steps of:

coupling a sensor to said system for detecting the condition and generating a condition signal;

coupling a tunable transducer to said sensor to provide a voltage to said sensor, said transducer being tunable to the stray energy of the system; and coupling a wireless communications link to said sensor for transmission of said condition signal.

25. The method as recited in claim 24 further comprising:

coupling a processor to the transducer and utilizing the processor to adaptively tune the transducer to achieve a maximum power transfer to the wireless communications link.

* * * * *